Oct. 21, 1969  C. R. CHRISTIANSON  3,473,310
HARVESTING APPARATUS

Filed Aug. 16, 1965  9 Sheets-Sheet 1

INVENTOR
Carl Raymond Christianson
by Stone, Zummer & Livingston
Attys

Oct. 21, 1969     C. R. CHRISTIANSON     3,473,310

HARVESTING APPARATUS

Filed Aug. 16, 1965                                 9 Sheets-Sheet 2

INVENTOR
Carl Raymond Christianson by Stone Zummer & Livingston
Attys

Oct. 21, 1969  C. R. CHRISTIANSON  3,473,310
HARVESTING APPARATUS

Filed Aug. 16, 1965　　　　　　　　　　　　　9 Sheets-Sheet

INVENTOR
Carl Raymond Christianson
by Stone, Zummer & Livingston
Att'ys

Oct. 21, 1969    C. R. CHRISTIANSON    3,473,310
HARVESTING APPARATUS

Filed Aug. 16, 1965    9 Sheets-Sheet 8

INVENTOR
Carl Raymond Christianson
by Stone, Zummer & Livingston
Attys

Oct. 21, 1969  C. R. CHRISTIANSON  3,473,310
HARVESTING APPARATUS

Filed Aug. 16, 1965  9 Sheets-Sheet 9

INVENTOR
Carl Raymond Christianson
by Stone Zimmer & Livingston
Attys

United States Patent Office 3,473,310
Patented Oct. 21, 1969

3,473,310
HARVESTING APPARATUS
Carl Raymond Christianson, 915 Michigan St.,
Sturgeon Bay, Wis. 54235
Filed Aug. 16, 1965, Ser. No. 480,003
Int. Cl. A01g 19/06
U.S. Cl. 56—329                                    17 Claims

ABSTRACT OF THE DISCLOSURE

A harvesting apparatus which has a U-shaped frame for straddling a tree. A pair of drive wheels are mounted on the frame relative to the tree, and a guide is connected to the frame for engaging the tree to direct the movement of the frame. A produce catcher and conveyor is mounted within the frame to carry away produce, and a deflectable cover is mounted on the produce catcher for receiving a portion of the tree and to deflect produce into the produce catcher. A produce shaker is mounted on the frame and is engageable with the tree to shake loose produce from the tree to be collected by the produce catcher and conveyor.

---

This invention relates to a harvesting apparatus and especially to an apparatus for harvesting produce, such as, fruit, berries and nuts which grow on trees in substantial amounts and which produce is harvested commercially.

Produce, such as, fruit, berries and nuts, which normally grows on trees, is customarily harvested by workers who pick each separate piece of produce and place the piece in a collector. Although the workers attain great proficiency and speed in gathering the produce, cost of gathering the produce by hand is substantial. With the increase of cost, many orchards are unable to continue operation because the cost of the produce becomes prohibitive for the average consumer, and the consumer turns away from fresh product to other products which may be made more efficiently involving imitation flavors and the like.

The high cost of removal of produce from trees is recognized and many attempts have been made to provide an economical means for removal of produce from the trees. Most of the present-day devices involve the utilization of a single device which attaches to the trunk of the tree, and the entire trunk is then vibrated in a violent manner. It has been observed that shaking of the trunk of trees with a mechanical device is unsatisfactory for many reasons. Some of the reasons are that there is often severe damage to the trees by the breaking of limbs and in some instances, up-rooting or loosening of the roots of the tree. Furthermore, the shaking of the tree trunk does not remove all of the produce on the trees especially if the shaking is limited so that there is little or no damage to the tree. It is, therefore, a principal object of the present invention to provide a harvesting apparatus whereby substantially all produce from a tree is mechanically removed from the tree.

It is another object of the herein disclosed invention to provide an apparatus for harvesting produce from a tree which harvesting apparatus shakes individual branches of a tree to minimize the damage to the tree and to remove substantially all of the produce on the individual branches.

It is a still further object of the instant invention to provide an apparatus for harvesting produce from a tree which apparatus moves constantly through an orchard to allow individual branches of a tree to be vibrated for removal of produce and to move under its own power and its own guide from one tree to the next in a given row.

It is a further object of the present invention to provide an improved construction for a shaker for use on a harvesting apparatus which shaker securely grips a branch of a tree with little or no damage to the branches.

Other objects and uses of this invention will become readily apparent to those skilled in the art upon a perusal of the following specification in light of the accompanying drawings, in which:

Figure 2:
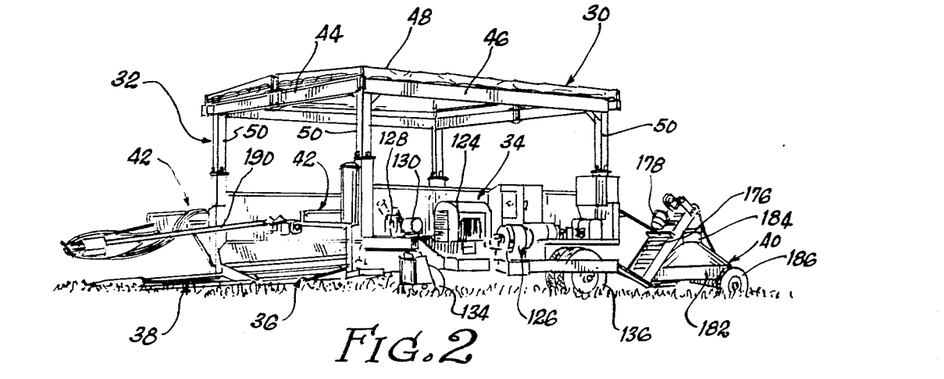
FIGURE 2 is a perspective view of the front and side of the harvesting apparatus shown in FIGURE 1.
Figure 3:
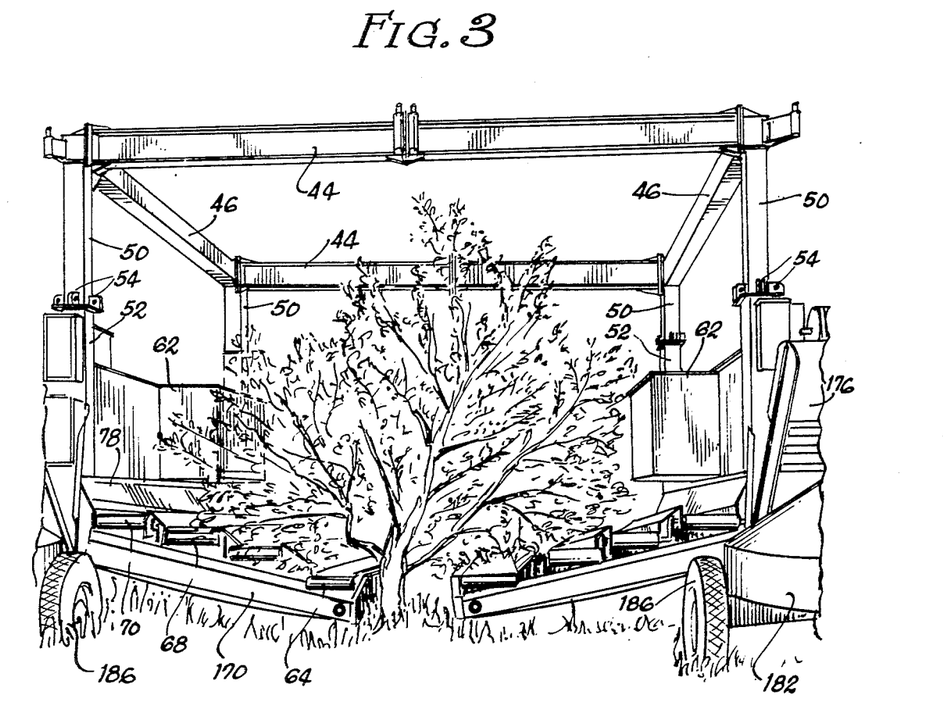
FIGURE 3 is an enlarged view of a portion of the rear of the harvesting apparatus shown in FIGURE 1, but with a cherry tree straddled by the apparatus.

Referring now to the drawings, and especially to FIGURE 2, a harvesting apparatus embodying the herein disclosed invention is shown therein and generally indicated by numeral 30. The apparatus 30 generally consists of a generally U-shaped frame 32, a power supply system 34 mounted on the frame 32, a produce catcher 36 mounted on the frame between the sides of the frame, a guide 38 connected to the frame, a pair of identical produce receptacles 40, and a pair of produce removal apparatuses 42 mounted on opposite sides of the frame.

Figure 14:
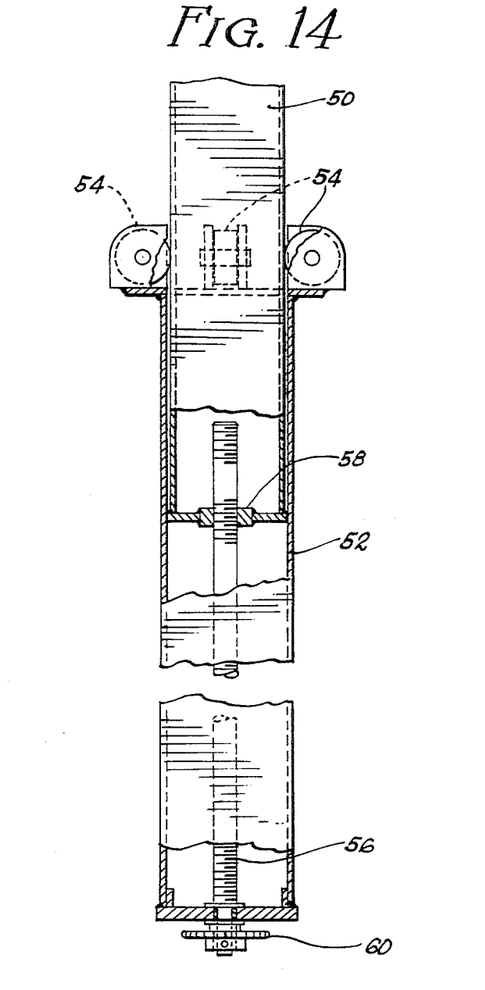
FIGURE 14 is an enlarged view of one of the posts of the subject apparatus showing a vertical adjustment control device.

The U-shaped frame 32, which is actually an inverted U, has the bottom of its U formed by a pair of lateral beams 44 which are fixed to a pair of longitudinal beams 46. A roof 48 is fixed to the beams to provide a cover for workmen riding the apparatus as will be described hereinafter. In each corner of the bottom of the U, there is a post 50 which is telescopically received into a respective support 52 as may be clearly seen in FIGURE 14. Four rollers 54 are rotatably mounted on the support 52 to provide a guide for the post 50. The support 52 has a threaded adjustment rod 56 mounted therein which rod threadedly engages an adjustment plate 58 in the bottom of post 50. The rod 56 includes a wheel 60 which is used to rotate the rod 56 thereby raising or lowering the post 50. Thus, the height of the frame may be selectively positioned. Mounted on each side of the frame is a basket 62 to provide a convenient place for workmen to ride the apparatus for reasons which will become apparent hereinafter.

The produce catcher 36, which has two independent frames attached to each side of the U-shaped frame, is divided into two parts which are identical to each other but are a mirror image of each other. The produce catcher is divided into two parts so that the apparatus may straddle a tree and move longitudinally relative to the tree while the tree is being harvested.

Figures 5, 6, 7:
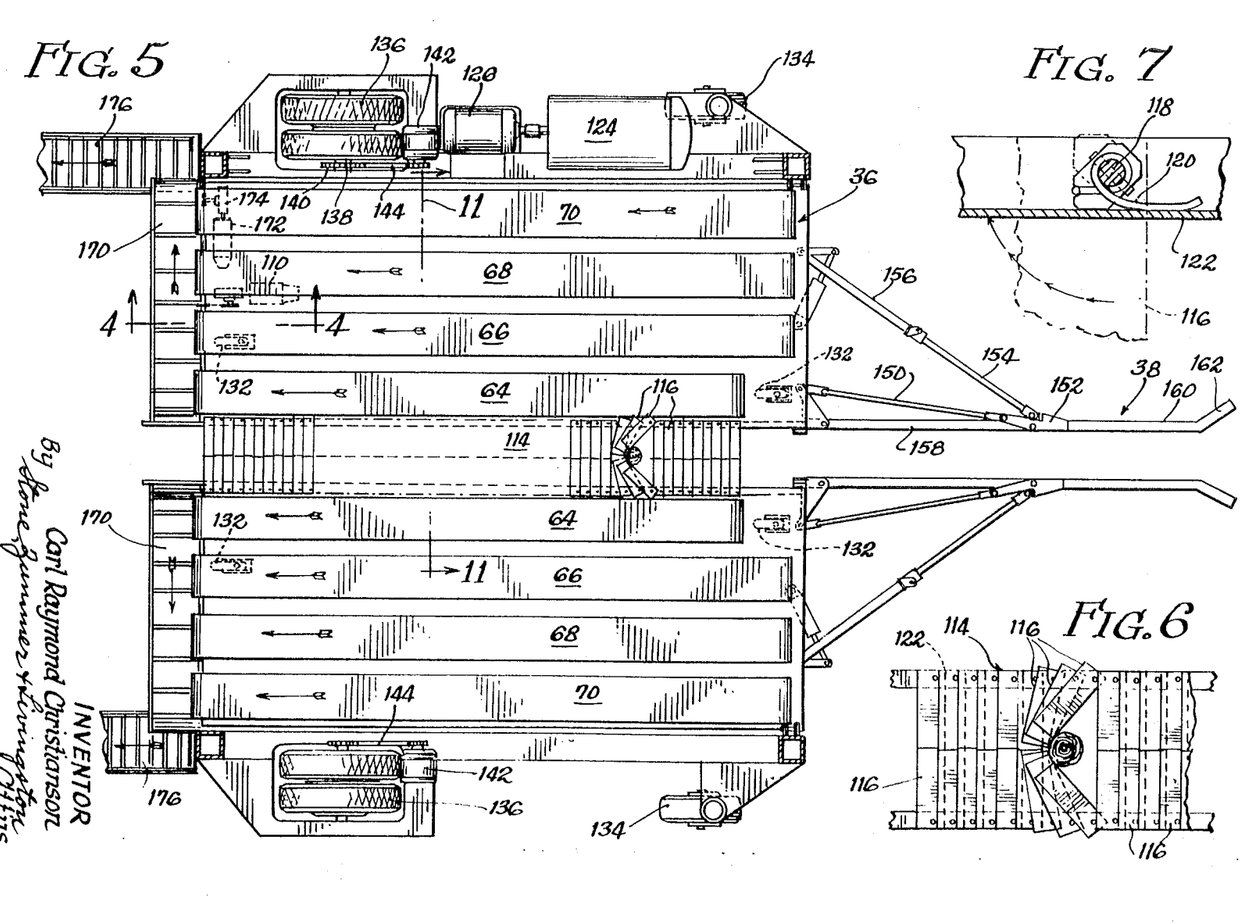
FIGURE 5 is a top plan view of the apparatus shown in FIGURE 1 but with the top removed in order to show the arrangement of longitudinal conveyors in the subject apparatus.
FIGURE 6 is an enlarged fragmentary view of a portion of a deflector cover shown in FIGURE 5.
FIGURE 7 is an enlarged fragmentary view of a portion of one of the cover members shown in FIGURE 6 with the cover member per se being shown in phantom view.
Figure 11:
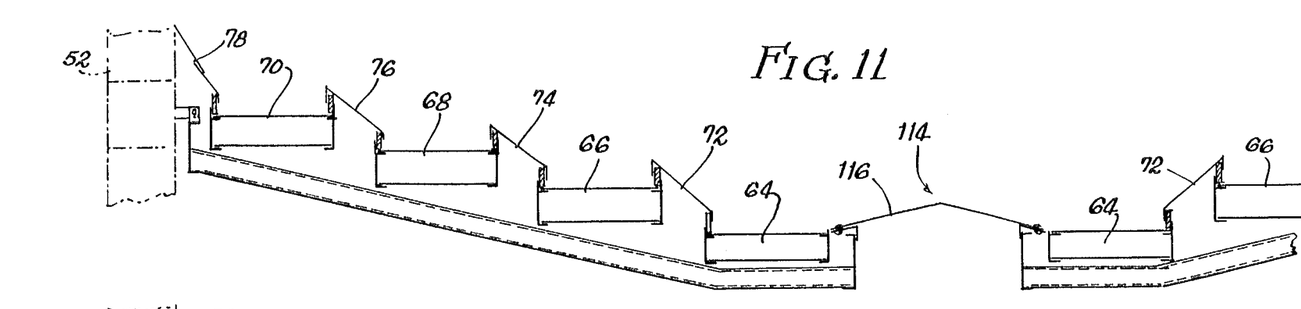
FIGURE 11 is an enlarged partial cross-sectional view taken on line 11—11 of FIGURE 5.
Figure 12:
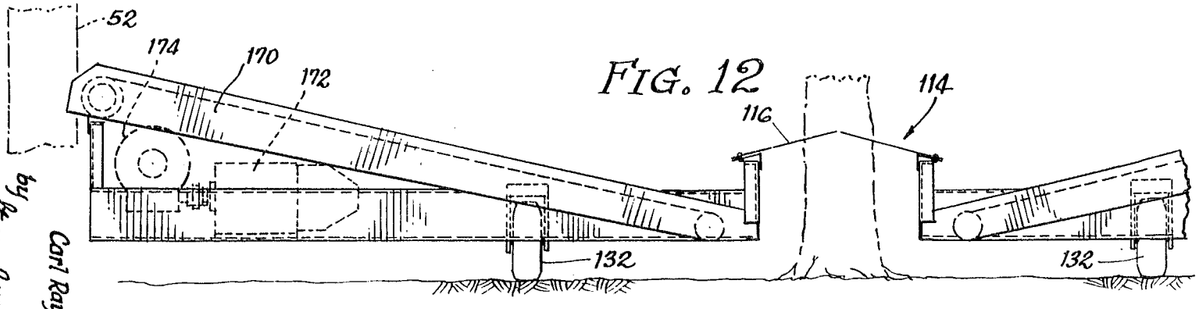
FIGURE 12 is an enlarged end view of a portion of the rear of the device shown in FIGURE 1.

Looking now to FIGURE 5, it may be seen that the produce apparatus has in each part or half four longitudinal conveyors 64, 66 and 68 and 70. As may be clearly seen in FIGURE 11, conveyor 64 is the lowest of the four conveyors, while conveyor 70 is the uppermost. Conveyors 66 and 68 are between the conveyors 64 and 70 with conveyor 68 being above conveyor 66. Between conveyors 64 and 66 there is a deflector plate 72 and there is a similar deflector plate 74 between conveyors 66 and 68. A deflector plate 76 is positioned between conveyors 68 and 70 and a deflector plate 78 is positioned between conveyor 70 and a side wall of the frame. The conveyor 64, 66, 68, and 70 are all conventional in construction in that they each have an idler roller which is not shown and a drive roller.

Figure 4:
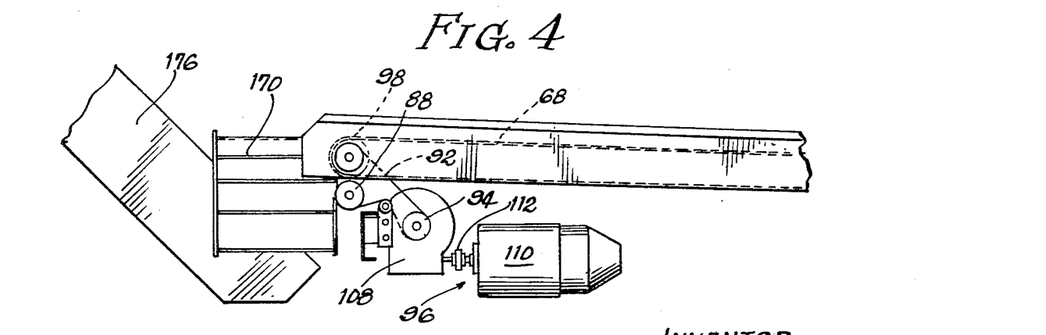
FIGURE 4 is an enlarged fragmentary view of the portion of a drive arrangement for conveyors which constituted a part of the apparatus shown in FIGURE 1 and is taken on line 4—4 of FIGURE 5.
Figure 13:
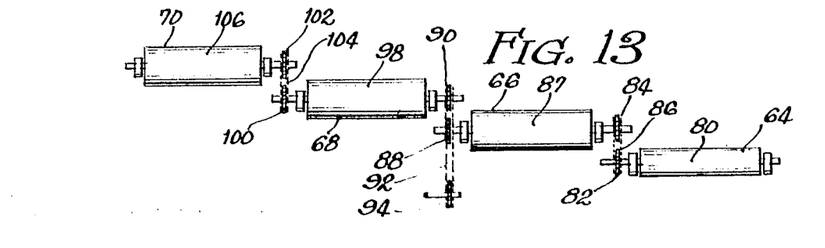
FIGURE 13 is an enlarged view of conveyor drive rollers showing the driving connection between the conveyor drive rollers.

As may be seen in FIGURE 13, conveyor 64 includes a drive roller 80 with a sprocket 82 drivingly connected to a sprocket 84 by means of a chain 86. The sprocket 84 is connected to a drive roller 87 of conveyor 66. The drive roller 87 has a sprocket 88 fixed thereto which is drivingly connected to a sprocket 90 by means of a chain 92 which is also connected to a power sprocket 94 which power sprocket is in turn connected to a drive means 96. The sprocket is connected to a drive roller 98 of the conveyor 68. Drive roller 98 is also drivingly connected to sprocket 100 which is connected to sprocket 102 by means of chain 104. The sprocket 102 is drivingly connected to drive roller 106 of conveyor 70. It is evident that the drive means 96 simultaneously drives all of the drive rollers 80, 86, 98, and 106 and since all of the sprockets are of the same size, the conveyors operate at the same speed and in the same direction so that any produce which may be on the conveyors is carried to one end. As is shown in FIGURE 4, drive means 96 includes a speed reducer 108 which is connected to a longitudinal conveyor electric motor 110 through a coupling 112. Although only one half of the conveyor arrangement for the produce catcher has been described in detail, it is apparent that the other one half is identical in construction.

As was mentioned above, the produce catcher is divided into two parts so that the apparatus may straddle a tree and move longitudinally relative to the tree. In order to prevent produce from falling between the two parts of the produce catcher, a deflector cover 114 is attached to the two parts of the produce catcher, thereby providing in effect a continuous surface from one side of the frame to the other as may be best seen in FIGURE 5. The deflector cover consists of a plurality of light gauge steel plates 116.

Each plate is fixed to a plate pin 118 and a spring 120 is secured to each plate pin 118 and engages a portion 122 of the respective frame of the produce catcher. As may be seen in FIGURE 6, the plates 116 are mounted on both parts of the produce catcher. It is also apparent that as the apparatus moves relative to a tree, the plates are pivoted at the pins 118 against the force of the respective springs 120 to allow the apparatus to move relative to the tree, and once the tree passes the plate, the plate 116 resumes its closed attitude as is shown in FIGURE 6.

The power supply 34 for the subject apparatus is mounted on one side of the frame. The power supply includes a diesel engine 124 which diesel engine 124 is conventional in its construction. The diesel engine has its output connected to an electric generator 126. The electric generator provides a source of electrical energy which drives a plurality of electric motors in the subject apparatus. The electrical wiring diagram for the subject apparatus is not shown herein inasmuch as it is conventional. The power supply includes a fluid pump 128 which is driven by a pump electric motor 130. The source of electrical energy for the pump 130 is derived from generator 126. The conveyor motor 110 is also electrically connected to generator 126 so that the longitudinal conveyors are ultimately powered by the diesel engine.

The U-shaped frame is supported on a plurality of wheels so that the frame may be moved relative to the plants to be harvested. The produce catcher which has two independent frames has a pair of independent caster wheels 132 attached to each of the frames as may be best seen in FIGURE 5. A pair of front caster wheels 134 is attached to the front end of the U-shaped frame. On each side of the frame, there is a pair of drive wheels 136. Each pair of drive wheels 136 operates independently of the other pair, and each pair is mounted on a drive axle 138 which has a sprocket 140 fixed thereto. A drive wheel electric motor 142 is mounted on the frame 32 adjacent to each of the pairs of wheels and is connected to the respective drive sprocket 140 by a drive wheel chain 144. The motors 142 are synchronous motors so that they operate at the same speed under normal conditions to move the apparatus 30 in a straight line. However, it may be appreciated that in order to turn the apparatus, one of the motors may be slowed down or stopped by an appropriate control device which is well known and not shown herein to cause the apparatus to turn. It is apparent that by use of electric motors to drive the pairs of drive wheels 136, there is no need for a mechanical connection between the pairs of drive wheels. The motors 142 are electrically connected to the output of the electric generator 126 by appropriate wiring which is not shown herein.

Figures 8, 9, 10:
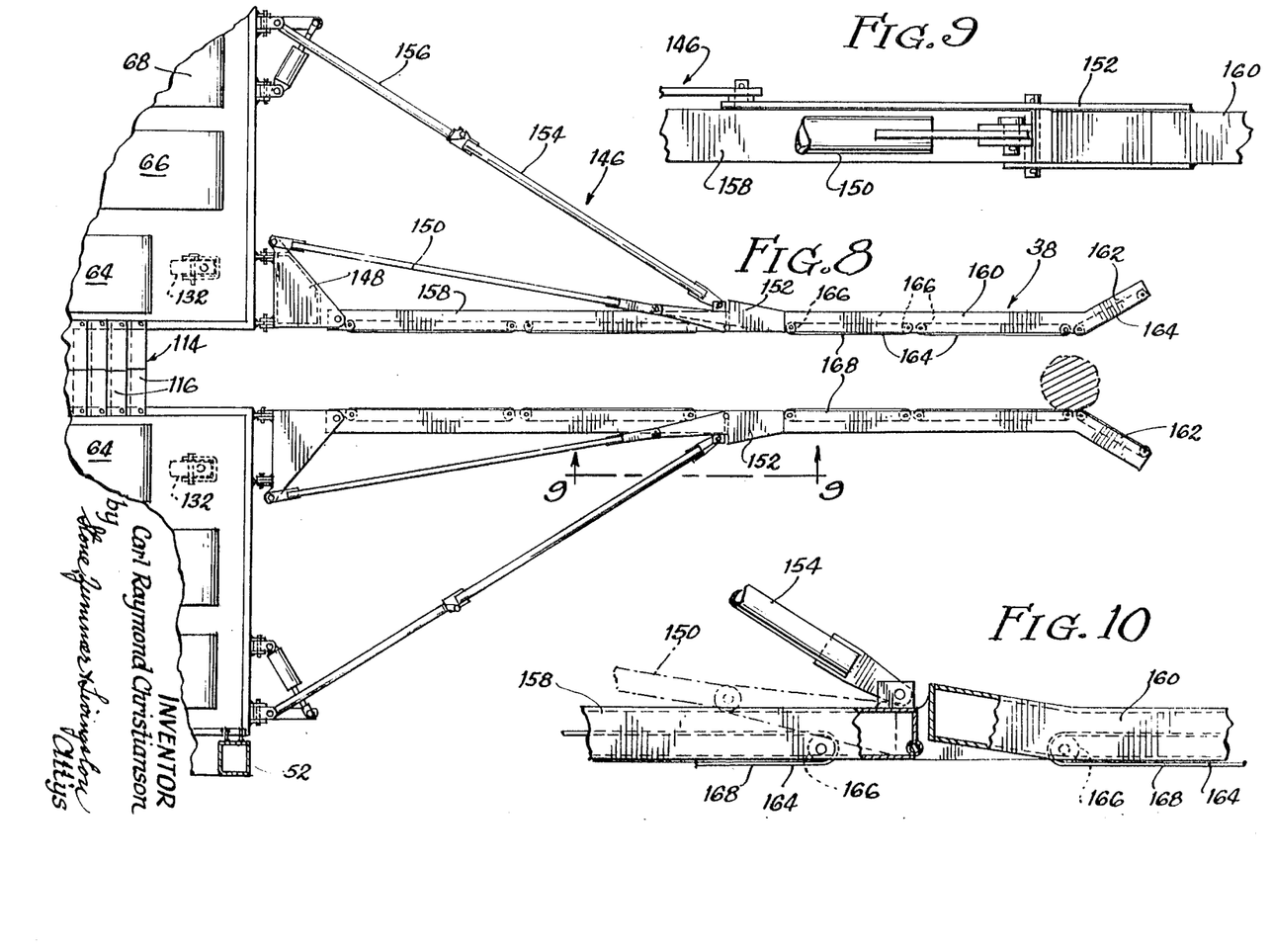
FIGURE 8 is an enlarged view of a guide which is a portion of the apparatus and is shown in FIGURE 5.
FIGURE 9 is a partial cross-sectional view taken on line 9—9 of FIGURE 8.
FIGURE 10 is an enlarged top view of a portion of the device shown in FIGURE 9.

As was mentioned above, the apparatus 30 is provided with a guide 38 at its front portion. The construction of guide 38 may be best seen in FIGURES 8 through 10. The guide 38 is divided into two halves which are mirror images of each other, and the two halves are connected to the two frames of the produce catcher. One half will be described in detail herein. One guide half 146 includes a triangular mount 148 which is hingedly connected to its respective frame. A stabilizing rod 150 is connected to the mount 148 at one end and to a central joint 152 at the other end. An outer joint rod 154 has one end connected to the joint 152 and the end connected to an outer frame rod 156 which is hingedly connected to its respective frame. An inner channel 158 is connected to mount 148 and the joint rod 154. An outer cantilever channel 160 is fixed to joint 152 with an ear 162 formed integral with the outermost end of the channel 160. A plurality of tree protectors 164 are mounted on the channels 158 and 160 and ear 162. The tree protectors 164 each include a pair of rollers 166 with a continuous flexible band or belt 168 mounted on the rollers 166. It may be seen that as the apparatus moves longitudinally relative to a tree, the opportunity for the bark of the tree to be rubbed and thus scarred is minimized because the flexible band 168 moves with the tree rather than abrading the tree as the guide passes the tree. It should be also noted that the guide is hingedly connected to the respective frames so that the guide may be raised at the end of a row of trees in an orchard to reduce the required turning space of the apparatus.

As may be clearly seen in FIGURE 5, a lateral conveyor 170 is mounted on the rear of each of the frames of the produce catcher. The lateral conveyor is conventional in its construction and is driven by a lateral conveyor electric motor 172 through lateral conveyor speed reducer 174. The connection of the speed reducer with the conveyor is conventional and the electric motor 172 is connected to generator 126 by appropriate wiring. It is apparent that as the produce is carried along the longitudinal conveyors, it is delivered to the lateral conveyors 170 which carry the produce laterally of the longitudinal conveyors to a produce elevator 176.

The produce elevator 176 is driven by a produce elevator electric motor 178 to raise the produce to a funnel 180 from whence it drops into its respective produce receptacle 40. Each of the produce receptacles is detachedly connected to the frame and is identical in construction to the other produce receptacle. Each of the produce receptacles 40 includes a tank 182 having a stack 184 for receiving produce. The tank 182 is supported by a pair of opposed wheels 186 and a caster wheel 188. It is evident that the produce receptacles may be detached when filled and taken to a processing station and an empty produce receptacle replaced in the position of the first produce receptacle.

Figure 15:
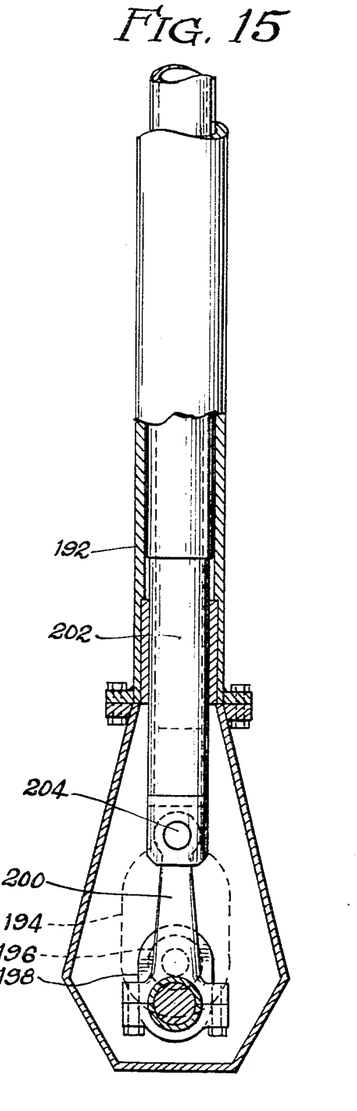
FIGURE 15 is an enlarged partial cross-sectional view of a portion of a shaker of the subject apparatus.
Figure 16:
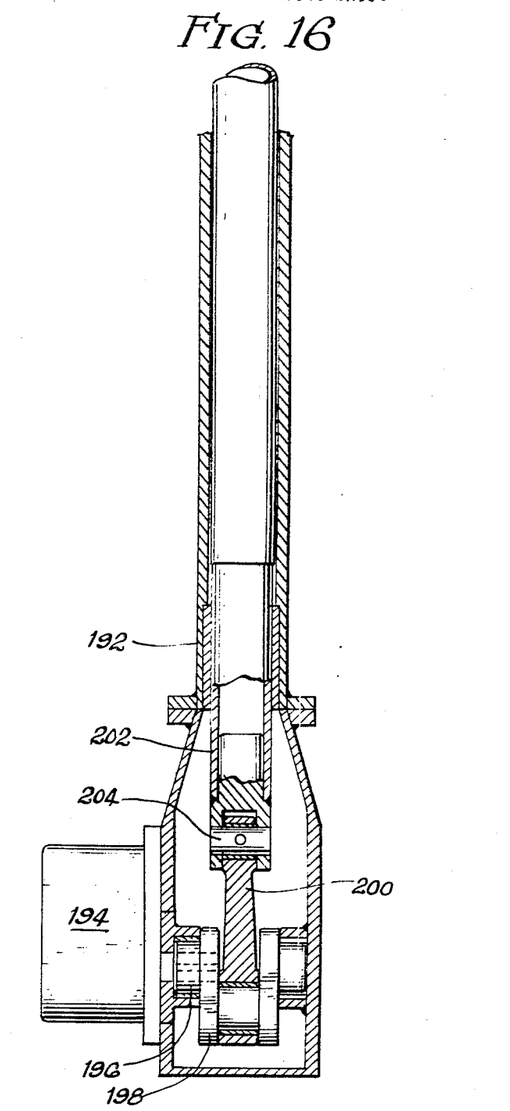
FIGURE 16 is a partial cross-sectional view of the apparatus shown in FIGURE 15.

Mounted on each side of the frame 32 is a shaker support arm 190. The shaker support arm is pivotally connected to the frame at one end and a shaker or produce removal apparatus 42 is attached to the other end. The produce removal apparatus is fluid operated and receives fluid under pressure from the fluid pump 128 by conventional piping which is not shown in detail herein. Each shaker is identical in construction to the other shaker. Looking now to FIGURES 15 and 16 which show a portion of the shaker, it may be seen that the shaker includes a shaker frame 192 which is attached to the respective shaker support arm 190. A fluid motor 194 is connected to the shaker frame and is connected to the fluid pump 128 by conventional flexible piping which is not shown herein. The shaker motor has its output connected to a crank shaft 196 having a crank throw 198. The throw is rotatably connected to connecting rod 200 which has one end pivotally connected to a shaker arm 202 through a conventional wrist pin 204. The shaker arm 202 is connected to a gripper head 206 so that as the shaker arm reciprocates so does the gripper head to vibrate the head.

Figures 17, 18, 19:
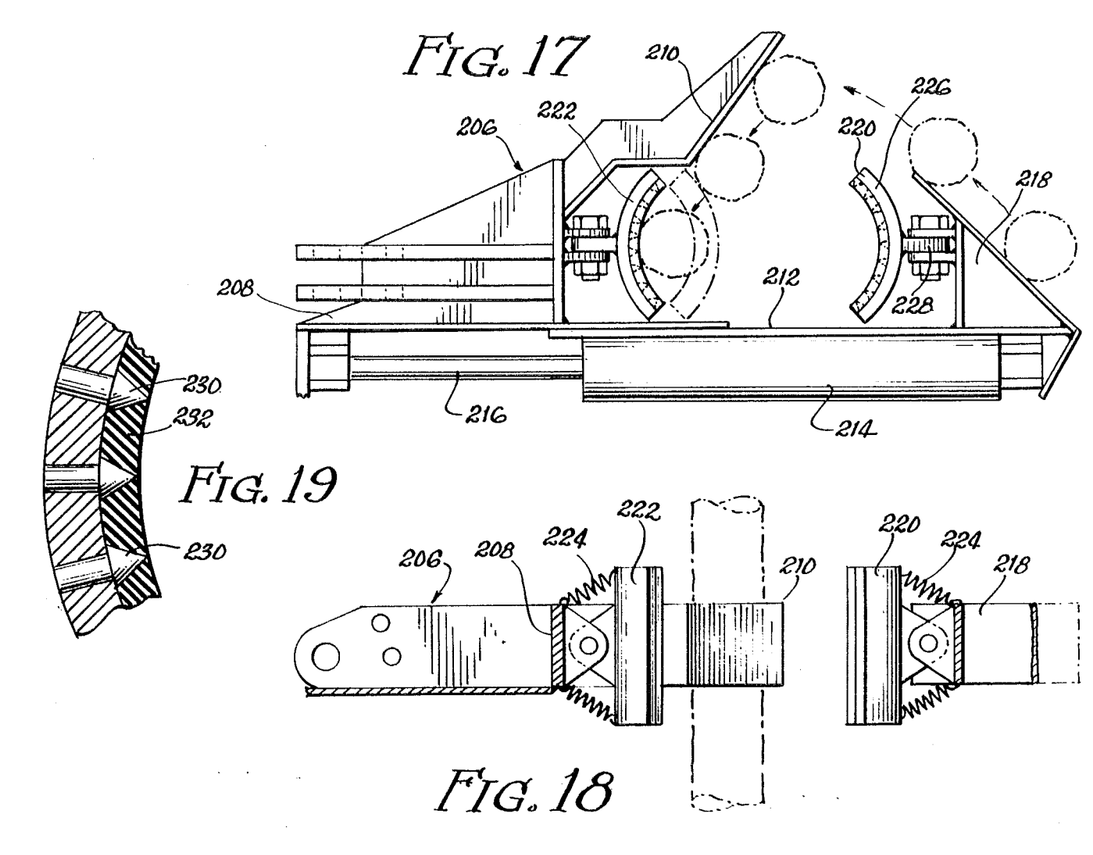
FIGURE 17 is an enlarged plan view of a gripper head which is connected to the portion of the shaker.
FIGURE 18 is a side view of the gripper head shown in FIGURE17.
FIGURE 19 is an enlarged view of a jaw which constitutes a portion of the gripper head shown in FIGURE 17.

The gripper head includes a gripper head base 208 with a guide ear 210 fixed therein. A slide 212 is slidably connected to base 208 and a fluid operating cylinder 214 is fixed to slide and has a piston rod 216 connected to the base so that operation of the cylinder causes the slide to move relative to the base. The cylinder 214 is connected to the fluid power source by conventional piping. The slide has a jaw support 218 fixed thereon with a movable jaw 220 pivotally connected thereto. The base 208 also has a fixed jaw 222 pivotally connected thereto and the jaws are held in position by tension springs 224 which allow the jaws to align themselves relative to each other and relative to a tree branch. Both the movable jaw and the fixed jaw are identical in construction in that each jaw has an arcuate base 226 with an ear 228 soldered thereto for connection to its respective support. Each arcuate base has a plurality of sharp pointed pins 230 fixed therein on the inner surface thereof. The pins 230, as may be best seen in FIGURE 19, have sharp points for engagement with the tree branch. A soft rubber 232 covers the entire inner surface of the arcuate base and all of the pins up to the tips of the points so that the space between the pins is filled with rubber. It may be appreciated that when the jaws clamp onto a tree branch the pins penetrate the bark and the rubber 232 is compressed inasmuch as the pins penetrate the bark. The gripper head is firmly secured to the tree branch by the pins and when the movable jaw is released, the removal of the pins from the bark does not loosen the bark from the tree so that the bark is not severely damaged. The rubber 232 has the effect of pushing the bark onto the tree as the pins are pulled out. Thus, the tree branch is left only with a plurality of small holes which easily heal so that there is only slight damage to the tree.

Looking now to FIGURES 20 through 23, a modified form of a gripper head is shown therein and generally indicated by numeral 234. The gripper head 234 is also connected to the shaker arm 202 by conventional means which is not shown herein. The gripper head includes a gripper head frame 236 which has fixed slotted jaw 238 at one end. A pair of jaws 240 and 242 are pivotally mounted on the frame 236. The jaw 240 includes a pair of arms while the jaw 242 is a single jaw. Both jaws 240 and 242 have a plurality of pins covered with rubber as described above and shown in detail in FIGURE. 19. The jaws 240 and 242 are driven by a gear arrangement.

Figure 20:
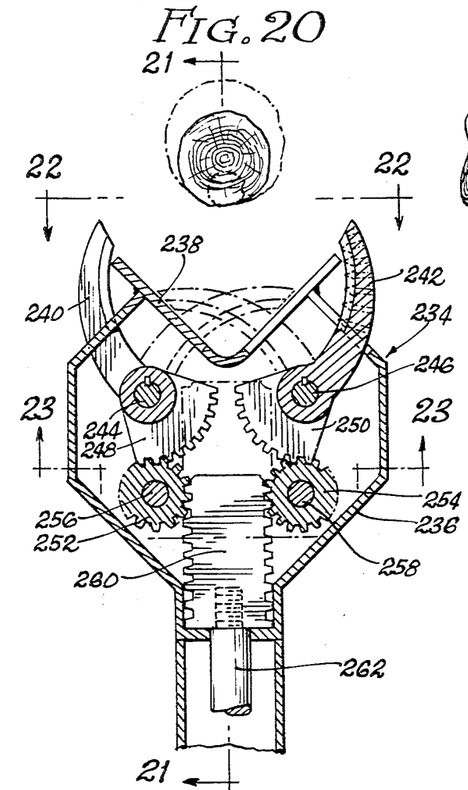
FIGURE 20 is an enlarged cross-sectional view of a modified form of a gripper head.
Figure 21:
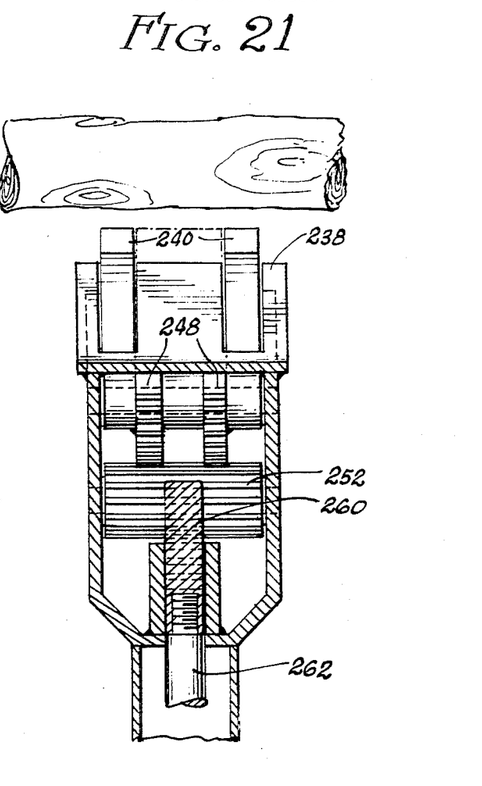
FIGURE 21 is a cross-sectional view of the gripper head shown in FIGURE 20 taken on line 21—21 of FIGURE 20.
Figure 22:
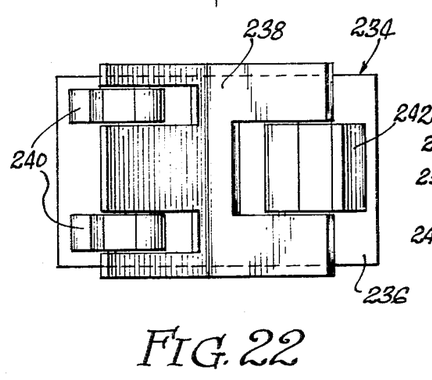
FIGURE 22 is an end view of the gripper head of FIGURE 20 taken on line 22—22 of FIGURE 20.
Figure 23:
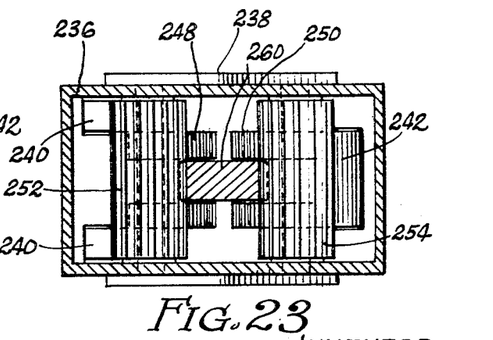
FIGURE 23 is a cross-sectional view taken on line 23—23 of FIGURE 20.

The gear arrangement for the jaws of head 234 is best seen in FIGURES 20 and 23. The jaws 240 and 242 are mounted on jaw pins 244 and 246, respectively. Gear segments 248 and 250 are fixed to jaws 240 and 242, respectively. Idle gears 252 and 254 are mounted on gear pins 256 and 258, respectively, and gears 252 and 254 mesh with segments 248 and 250, respectively. A rack 260 meshes with the idle gears 252 and 254 to rotate the gears and thus pivot the jaws 240 and 242 about their respective pins.

The rack 260 is connected to a rack rod 262 which is connected to a conventional fluid power cylinder which is not shown herein. It may be appreciated that in order to close the jaws 240 and 242, the rack 260 is moved toward the fixed jaw 238 to rotate the gears 252 and 254 which mesh with gear segments 248 and 250 so that the jaws pivot about their respective pins to close. Retraction of the rack opens the jaws. Inasmuch as the jaws contain the same pin and rubber arrangement, a tree branch is securely held by the jaws as was described above.

The apparatus operates in the manner described below. For purposes of illustration the operation of the subject apparatus will be described in terms of harvesting cherries. However, it is to be expressly understood that other produce may be similarly harvested with the subject apparatus.

Figure 1:
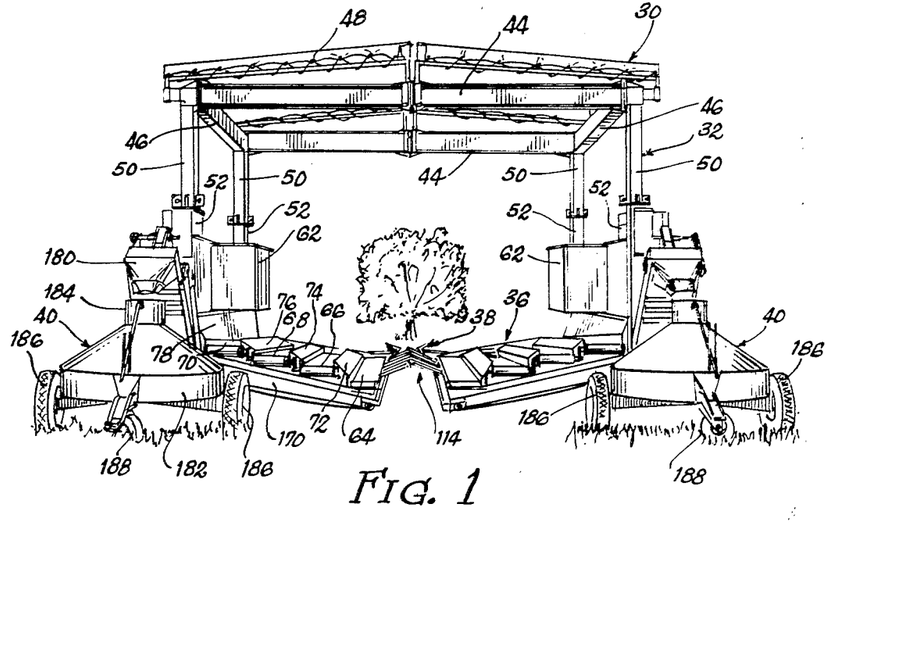
FIGURE 1 is an end view of the rear of a harvesting apparatus embodying the herein disclosed invention.

Cherry orchards as well as most other commercial orchards are laid out with the trees arranged in a substantially straight line for a given row. The apparatus 30 is driven to the end of a row and aligned with the trees similar to the manner shown in FIGURE 1. The guide 38 is aligned with a cherry tree so that the trunk of the tree is between the two guide halves. Workmen mount the apparatus with one workman in each of the baskets 62. Each workman controls a shaker 42 which is pivoted on shaker support arm 190.

The diesel engine 124 operates to drive the electric generator 126 so that the apparatus 30 has its own power supply. The drive wheel electric motor 142 drives their respective chains 144 to drive the drive wheels 136. As was mentioned above, the motors 142 are synchronous motors so that they operate in the same speed, thus driving the apparatus 30 in a straight line.

As the apparatus 30 moves forward, the trunk of the tree may engage one half of the guide 38 so that the tree engages one of the bands 168. Since the band is free to move on the rollers 166 relative to the guide, the band remains stationary relative to the tree so that there is no opportunity for the guide to bruise the tree trunk. Inasmuch as all of the wheels of the apparatus except the drive wheels are caster-mounted wheels, the entire apparatus is guided on the tree trunk. As the apparatus moves longitudinally relative to the tree, the tree trunk engages the deflector cover 114. The plates 116 are pivoted relative to their respective pins so that there is no space between the two parts of the produce catcher which is open. The workmen riding in baskets 62 then guide the shakers 42 so that a branch is positioned between the jaws 220 and 226. By appropriate control means which is conventional and not shown herein, cylinder 214 is actuated to clamp the tree branch between the jaws. The clamping force causes the pins 230 on the jaws to penetrate the bark of the cherry tree branch and to compress the rubber 232. It may be appreciated that the combination of the pins plus the clamping force holds the branch securely between the jaws. In the event that the modified gripper head 234 is used a similar cylinder is used to move the rack 260 to pivot jaws 240 and 242 to grip the branch between the movable jaws and the fixed jaw. Once the branch is securely held the fluid motor 194 is activated to reciprocate the shaker arm 202 and thus the gripper head is attached to the shaker arm. It should be noted that a given branch is held by the gripper so that the shaking loosens all of the cherries on the branch and the cherries fall to the produce catcher.

When the cherries fall to the produce catcher, the deflector plates insure the collection of the cherries on one or more longitudinal conveyors. The longitudinal conveyors which are driven by electric motor 110 carry the cherries to the rear of the apparatus where the cherries are then transferred to the lateral conveyors 170. The lateral conveyors 170 carry the cherries to the respective elevators 176 which produce elevators lift the cherries and discharge them into a respective funnel 180 so that the cherries fall into the respective produce receptacle 40.

It should be noted that the apparatus is moving forward continuously so that the next cherry tree is then engaged by the guide 38. Thus, the apparatus is guided by the trees which are to be harvested and the position of the tree insures the positioning of the apparatus in a proper attitude relative to the tree.

After the cherries are all removed from one branch by shaking, the fluid cylinder is again actuated to disengage the movable jaw from the branches. It should be noted that when the jaws disengage the branch, the rubber 232 which is compressed, holds the bark onto the tree so that there is no scoring of the bark of the cherry tree and the only damage which occurs to the trees is the small holes which are formed by the sharp pointed pins 230. These holes readily heal during the growing season so that there is no real damage to the branches. After the jaws are released, the gripper head is moved to the next branch where the shaking operation is repeated.

It should be noted that the subject device is flexible to accommodate changes in the contour of an orchard. Although, an orchard is substantially level, there are rises and depressions in the orchard. The two parts of the produce catcher have a certain degree of flexibility so that as the caster wheels 132 roll along the orchard the parts may have to rise and fall to accommodate the contour of the orchard.

When the apparatus comes to the end of the row, the apparatus may be readily turned. In order to decrease the required turning area, the guide 38 is pivoted upward so that the guide will not engage a fence or a tree. In order to turn the apparatus, one set of drive wheels is stopped and the other is allowed to turn so that the apparatus pivots about the stopped drive wheels. The guide 38 is then lowered and the apparatus proceeds as described above.

It may be appreciated that when the upper portion of the U-shaped frame is at its lowest point the frame has the greatest rigidity so it is desirable to accommodate the height of the frame to the height of the trees. As was mentioned above, the posts 50 may be adjusted vertically by use of the threaded rod 56 which selectively positions the height of the posts. The roof 48 provides protection from sun and rain for the workmen riding in the baskets 62 and also provides a certain degree of protection to the mechanisms of the apparatus.

It may be readily appreciated that the subject apparatus may also be used to provide a more efficient spraying of the trees in an orchard by enclosing the side and front and rear portions of the frame with canvas or other such materials. Nozzles may be mounted in the frame so that all sprayed material may be contained within the apparatus and thus spraying individual trees effectively and efficiently, even when there is a substantial amount of wind.

Although a specific embodiment of the herein disclosed apparatus has been shown and described in detail above, it is readily apparent that those skilled in the art may make various modifications and changes in the subject apparatus without departing from the spirit and the scope of the instant invention. It is to be expressly understood that the instant invention is limited only by the appended claims.

What is claimed is:

1. A harvesting apparatus comprising, in combination, a generally U-shaped frame adapted for straddling a plant to be harvested, a guide connected to the frame for straddling the plant to direct the apparatus on the plant to be harvested, a plurality of continuous bands on the guide adapted for engagement with the plant to remain stationary relative to the plant while the apparatus moves relative to the plant, support means connected to said frame for movably supporting said frame, a produce catcher attached to the frame and being divided into two parts for receiving a plant between the two parts as the harvesting apparatus moves longitudinally relative to the plant, and a produce removal apparatus supported on the frame and engageable with the branches of the plant for removal of produce from the plant.

2. A harvesting apparatus comprising, in combination, a generally U-shaped frame adapted for straddling a plant to be harvested, a guide connected to the frame for directing the apparatus in respect to the plants to be harvested, support means connected to said frame for movably supporting said frame, a produce catcher attached to the frame and being divided into two parts for receiving a plant between the two parts as the harvesting apparatus moves longitudinally relative to the plant, and a produce removal apparatus supported on the frame and engageable with the branches of the plant for removal of produce from the plant.

3. A harvesting apparatus comprising, in combination, a generally U-shaped frame adapted for straddling a plant to be harvested, a guide connected to the frame for controlling the apparatus relative to a plant to be harvested, drive means for moving the apparatus relative to the plant to be harvested, a produce catcher attached to the frame and being divided into two parts for receiving a plant between the two parts as the harvesting apparatus moves longitudinally relative to the plant, and a pair of longitudinal conveyors being a part of the produce catcher, one of said conveyors being in one part of the produce catcher and the other conveyor being in the other part to convey produce along opposite sides of the plant.

4. A harvesting apparatus comprising, in combination, a generally U-shaped frame adapted for straddling a plant to be harvested, support means connected to said frame for supporting said frame, a produce catcher attached to the frame and being divided into two parts for receiving the plant between the two parts as the harvesting apparatus moves longitudinally relative to the plant, a plurality of longitudinal conveyors constituting a portion of one of the parts of the produce catcher, a plurality of second longitudinal conveyors constituting a portion of the other part of said produce catcher, and a lateral conveyor at one end of each plurality of longitudinal conveyors for receiving produce from the longitudinal conveyors and moving the produce laterally of the produce catcher.

5. A harvesting apparatus comprising, in combination, a generally U-shaped frame adapted for straddling a plant to be harvested, a guide connected to the frame for controlling the direction of movement of the apparatus, drive means connected to said frame, drive means connected to said frame for moving said frame relative to the plant, a produce catcher attached to the frame and being divided into two parts for receiving the plant between the two parts as the harvesting apparatus moves longitudinally relative to the plant, a plurality of longitudinal conveyors constituting a portion of each of the parts of the produce catcher to move produce longitudinally on the produce catcher, and a lateral conveyor at one end of each plurality of longitudinal conveyors for receiving produce from the longitudinal conveyors and moving the produce laterally of the produce catcher.

6. A harvesting apparatus comprising, in combination, a generally U-shaped frame adapted for straddling a plant to be harvested, drive means connected to said frame for driving said frame, a produce catcher attached to the frame and being divided into two parts for receiving the plant between the two parts as the harvesting apparatus moves longitudinally relative to the plant, a plurality of conveyors constituting a portion of each of the parts of the produce catcher, and a secondary conveyor at one end of each plurality of the first mentioned conveyors for receiving produce from the first mentioned conveyors and moving the produce laterally of the first mentioned conveyors.

7. A harvesting apparatus comprising, in combination, a generally U-shaped frame adapted for straddling a plant to be harvested, drive means connected to the frame for moving said frame relative to the plant, a produce removal apparatus connected to the frame engageable with the plant to remove produce therefrom, a produce catcher attached to the frame and being divided into two parts for receiving the plant between the two parts as the harvesting apparatus moves longitudinally relative to the plant and to gather produce removed from the plant by the removal apparatus, a plurality of longitudinal conveyors constituting a portion of one of the parts of the produce catcher, a plurality of second longitudinal conveyors constituting a portion of the other part of said produce catcher, and a lateral conveyor at one end of each plurality of longitudinal conveyors for receiving produce from the longitudinal conveyors and moving the produce laterally of the produce catcher.

8. A harvesting apparatus comprising, in combination, a generally U-shaped frame adapted for straddling a plant to be harvested, a guide connected to the frame for controlling the movement of the apparatus relative to plants to be harvested, support means connected to said frame for movably supporting said frame, a produce catcher attached to the frame and being divided into two parts for receiving a plant between the two parts as the harvesting apparatus moves longitudinally relative to the plant, a deflectable cover attached to the produce catcher to provide a substantially continuous catching surface between two parts of the catcher, said cover being displaceable to allow the harvesting apparatus to move longitudinally relative to the plant between the two parts of the catcher and the cover to be displaced by the plant only at the position adjacent to the position occupied by the plant, and a produce removal apparatus supported on the frame and engageable with the branches of the plant for removal of produce from the plant.

9. A harvesting apparatus comprising, in combination, a generally U-shaped frame adapted for straddling a plant to be harvested, drive means connected to said frame for moving said frame longitudinally relative to said plant, a support arm pivotally connected to the frame, a shaker arm connected to said support arm, a branch gripper connected to said arm for releasably engaging a branch of the plant, a shaker motor connected to the shaker arm for vibrating the gripper and a branch being held by the gripper, and a produce catcher for gathering produce dislodged from the plant attached to the frame and being divided into two parts for receiving the plant between the two parts as the harvesting apparatus moves longitudinally relative to the plant.

10. A harvesting apparatus comprising, in combination, a generally U-shaped frame adapted for straddling a plant to be harvested, a plurality of wheels connected to and supporting one side of said frame, a drive wheel included in said plurality of wheels, a plurality of second wheels connected to and supporting the other side of said frame, said plurality of second wheels including a second drive wheel, an electric motor drivingly connected to each of said drive wheels, an electric generator electrically connected to each of the electric motors to provide power for operating the electric motors, an internal combustion engine connected to the electric generator to drive said generator, a longitudinal conveyor connected to one side of the frame, an conveyor electric motor drivingly connected to the longitudinal conveyor to drive said conveyor in one direction, a lateral conveyor mounted on one side of the frame for receiving produce from the longitudinal conveyor, an electric motor drivingly connected to the lateral conveyor and being electrically connected to the electric generator, a second longitudinal conveyor connected to the other side of said frame and being spaced from the first mentioned longitudinal conveyor to receive the plant therebetween while the harvesting apparatus moves longitudinally relative to the plant, a motor drivingly connected to the second longitudinal conveyor and being electrically connected to the electric generator, a second lateral conveyor connected to the other side of the frame for receiving produce from the second longitudinal conveyor, an electric motor drivingly connected to the second lateral conveyor and being electrically connected to the electric generator, and a produce removal apparatus supported on the frame and engageable with the branches of the plant for removal of produce from the plant.

11. A harvesting apparatus comprising, in combination, a generally U-shaped frame adapted for straddling a plant to be harvested, a plurality of wheels connected to and supporting one side of said frame, a drive wheel included in said plurality of wheels, a plurality of second wheels connected to and supporting the other side of said frame, said plurality of second wheels including a second drive wheel, means drivingly connected to each of said drive wheels for independently driving said wheels, a longitudinal conveyor connected to one side of the frame, a lateral conveyor mounted on one side of the frame for receiving produce from the longitudinal conveyor, a second longitudinal conveyor connected to the other side of said frame and being spaced from the first mentioned longitudinal conveyor to receive the plant therebetween while the harvesting apparatus moves longitudinally relative to the plant, a second lateral conveyor connected to the other side of the frame for receiving produce from the second longitudinal conveyor, a guide connected to the front end of the harvesting apparatus to guide the harvesting apparatus on the plant to be harvested, and a shaker mounted on each side of the frame for holding a portion of the plant to be harvested for shaking the portion of the plant while the harvesting apparatus moves longitudinally relative to the plant.

12. A harvesting apparatus comprising, in combination, a generally U-shaped frame adapted for straddling a plant to be harvested, a plurality of wheels connected to and supporting one side of said frame, a drive wheel included in said plurality of wheels, a plurality of second wheels connected to and supporting the other side of said frame, said plurality of second wheels including a second drive wheel, an electric motor drivingly connected to each of said drive wheels, a plurality of longitudinal conveyors connected to one side of the frame, a longitudinal deflector plate positioned between each of the adjacent conveyors to deflect produce onto the longitudinal conveyors, a lateral conveyor mounted on one side of the frame for receiving produce from the longitudinal conveyors, a produce receptacle connected to the one side of said frame for receiving produce from the lateral conveyor, a plurality of second longitudinal conveyors connected to the other side of said frame and being spaced from the plurality of the first mentioned longitudinal conveyors to receive the plant therebetween while the harvesting apparatus moves longitudinally relative to the plant, a second longitudinal deflector plate between each of the second longitudinal conveyors to deflect produce onto the second longitudinal conveyors, a second lateral conveyor connected to the other side of the frame for receiving produce from the second longitudinal conveyors, a second produce receptacle connected to the other side of the frame for receiving produce from the second lateral conveyor, a deflector cover connected to the two pluralities of longitudinal conveyors to provide a substantially continuous surface between the two pluralities of conveyors, said cover being displaceable to allow the harvesting apparatus to move relative to the plant and the cover to be displaced by the plant as the harvesting apparatus moves longitudinally relative to the plant, and a shaker mounted on said frame for holding a portion of the plant to be harvested for shaking the portion of the plant while the harvesting apparatus moves longitudinally relative to the plant.

13. A harvesting apparatus comprising, in combination, a generally U-shaped frame adapted for straddling a plant to be harvested, a plurality of wheels connected to and supporting one side of said frame, a drive wheel included in said plurality of wheels, a plurality of second wheels connected to and supporting the other side of said frame, said plurality of second wheels including a second drive wheel, an electric motor drivingly connected to each of said drive wheels, an electric generator electrically connected to each of the electric motors to provide power for operating the electric motors, an internal combustion engine connected to the electric generator to drive said generator, a longitudinal conveyor connected to one side of the frame, a lateral conveyor mounted on one side of the frame for receiving produce from the longitudinal conveyor, a second longitudinal conveyor connected to the other side of said frame and being spaced from the first mentioned longitudinal conveyor to receive the plant therebetween while the harvesting apparatus moves longitudinally relative to the plant, a second lateral conveyor connected to the other side of the frame for receiving produce from the second longitudinal conveyor, a deflector cover connected to the two longitudinal conveyors to provide a substantially continuous surface between the two longitudinal conveyors, said cover being displaceable to allow the harvesting apparatus to move relative to the plant and the cover to be displaced by the plant as the harvesting apparatus moves longitudinally relative to the plant, a support arm pivotally connected to each side of the frame, and a shaker mounted on each support arm for holding a portion of the plant to be harvested for shaking the portion of the plant while the harvesting apparatus moves longitudinally relative to the plant.

14. A harvesting apparatus comprising, in combination, a generally U-shaped frame adapted for straddling a plant to be harvested, a plurality of wheels connected to and supporting one side of said frame, a drive wheel included in said plurality of wheels, a plurality of second wheels connected to and supporting the other side of said frame, said plurality of second wheels including a second drive wheel, an electric motor drivingly connected to each of said drive wheels, an electric generator electrically connected to each of the electric motors to provide power for operating the electric motors, an internal combustion engine connected to the electric generator to drive said generator, a longitudinal conveyor connected to one side of the frame, a conveyor electric motor drivingly connected to the longitudinal conveyor to drive said conveyor in one direction, a lateral conveyor mounted on one side of the frame for receiving produce from the longitudinal conveyor, a lateral conveyor electric motor drivingly connected to the lateral conveyor and being electrically connected to the electric generator, a produce elevator connected to the one side of the frame for receiving produce from the lateral conveyor and raising said produce, a produce receptacle connected to the one side of said frame for receiving produce from the produce elevator, a second longitudinal conveyor connected to the other side of said frame and being spaced from the plurality of the first mentioned longitudinal conveyor to receive the plant therebetween while the harvesting apparatus moves longitudinally relative to the plant, a second conveyor motor drivingly connected to the second longitudinal conveyor and being electrically connected to the electric generator, a second lateral conveyor connected to the other side of the frame for receiving produce from the second longitudinal conveyor, a second lateral conveyor electric motor drivingly connected to the second lateral conveyor and being electrically connected to the electric generator, a second produce elevator connected to the other side of the frame for receiving produce from the second lateral conveyor, a second produce receptacle connected to the other side of the frame for receiving produce from the second produce elevator, a deflector cover connected to the two pluralities of longitudinal conveyors to provide a substantially continuous surface between the longitudinal conveyors, said cover being displaceable to allow the harvesting apparatus to move relative to the plant and the cover to be displaced by the plant as the harvesting apparatus moves longitudinally relative to the plant, a support arm pivotally connected to each side of the frame, and a shaker mounted on each support arm for holding a portion of the plant to be harvested for shaking the portion of the plant while the harvesting apparatus moves longitudinally relative to the plant.

15. A harvesting apparatus comprising, in combination, a generally U-shaped frame adapted for straddling a plant to be harvested, a plurality of wheels connected to and supporting one side of said frame, a drive wheel included in said plurality of wheels, a plurality of second wheels connected to and supporting the other side of said frame, said plurality of second wheels including a second drive wheel, an electric motor drivingly connected to each of said drive wheels, an electric generator electrically connected to each of the electric motors to provide power for operating the electric motors, an internal combustion engine connected to the electric generator to drive said generator, a plurality of longitudinal conveyors connected to one side of the frame, a longitudinal deflector plate positioned between each of the adjacent conveyors to deflect produce onto the longitudinal conveyors, a lateral conveyor mounted on one side of the frame for receiving produce from the longitudinal conveyors, a produce elevator connected to the one side of the frame for receiving produce from the lateral conveyor and raising said produce, a produce receptacle connected to the one side of said frame for receiving produce from the produce elevator, a plurality of second longitudinal conveyors connected to the other side of said frame and being spaced from the plurality of the first mentioned longitudinal conveyors to receive the plant therebetween while the harvesting apparatus moves longitudinally relative to the plant, a second longitudinal deflector plate between each of the second longitudinal conveyors to deflect produce onto the second longitudinal conveyors, a second lateral conveyor connected to the other side of the frame for receiving produce from the second longitudinal conveyors, a second produce elevator connected to the other side of the frame for receiving produce from the second lateral conveyor, a second produce receptacle connected to the other side of the frame for receiving produce from the second produce elevator, a deflector cover connected to the two pluralities of longitudinal conveyors to provide a substantially continuous surface between the two pluralities of conveyors, said cover being displaceable to allow the harvesting apparatus to move relative to the plant and the cover to be displaced by the plant as the harvesting apparatus moves longitudinally relative to the plant, a support arm connected to and a shaker mounted on each side of the frame for holding a portion of the plant to be harvested for shaking the portion of the plant while the harvesting apparatus moves longitudinally to the plant.

16. A harvesting apparatus comprising, in combination, a generally U-shaped frame adapted for straddling a plant to be harvested, a plurality of wheels connected to and supporting one side of said frame, a drive wheel included in said plurality of wheels, a plurality of second wheels connected to and supporting the other side of said frame, said plurality of second wheels including a second drive wheel, an electric motor drivingly connected to each of said drive wheels, an electric generator electrically connected to each of the electric motors to provide power for operating the electric motors, an internal combustion engine connected to the electric generator to drive said generator, a plurality of longitudinal conveyors connected to one side of the frame, a lateral conveyor mounted on one side of the frame for receiving produce from the longitudinal conveyors, a produce elevator connected to the one side of the frame for receiving produce from the lateral conveyor and raising said produce, a produce receptacle connected to the one side of said frame for receiving produce from the produce elevator, a plurality of second longitudinal conveyors connected to the other side of said frame and being spaced from the plurality of the first mentioned longitudinal conveyors to receive the plant therebetween while the harvesting apparatus moves longitudinally relative to the plant, a second longitudinal deflector plate between each of the second longitudinal conveyors to deflect produce onto the second longitudinal conveyors, a second lateral conveyor connected to the other side of the frame for receiving produce from the second longitudinal conveyors, a second produce elevator connected to the other side of the frame for receiving produce from the second lateral conveyor, a second produce receptacle connected to the other side of the frame for receiving produce from the second produce elevator, a deflector cover connected to the two pluralities of longitudinal conveyors to provide a substantially continuous surface between the two pluralities of conveyors, said cover being displaceable to allow the harvesting apparatus to move relative to the plant and the cover to be displaced by the plant as the harvesting apparatus moves longitudinally relative to the plant, a guide connected to the front end of the harvesting apparatus to guide the harvesting apparatus on the plant to be harvested, a support arm pivotally connected to each side of the frame, and a shaker mounted on each support arm for holding a portion of the plant to be harvested for shaking the portion of the plant while the harvesting apparatus moves longitudinally relative to the plant.

17. An harvesting apparatus comprising, in combination, a generally U-shaped frame adapted for straddling a plant to be harvested, a plurality of wheels connected to and supporting one side of said frame, a drive wheel included in said plurality of wheels, a plurality of second wheels connected to and supporting the other side of said frame, said plurality of second wheels including a second drive wheel, an electric motor drivingly connected to each of said wheels, an electric generator electrically connected to each of the electric motors to provide power for operating the electric motors, an internal combustion engine connected to the electric generator to drive said generator, a plurality of longitudinal conveyors connected to one side of the frame, an conveyor electric motor drivingly connected to the longitudinal conveyors to drive said conveyors in one direction a longitudinal deflector plate positioned between each of the adjacent conveyors to deflect produce onto the longitudinal conveyors, a lateral conveyor mounted on one side of the frame for receiving produce from the longitudinal conveyors, a lateral conveyor electric motor drivingly connected to the lateral conveyor and being electrically connected to the electric generator, a produce elevator connected to the one side of the frame for receiving produce from the lateral conveyor and raising said produce, a produce receptacle connected to the one side of said frame for receiving produce from the produce elevator, a plurality of second longitudinal conveyors connected to the other side of said frame and being spaced from the plurality of the first mentioned longitudinal conveyors to receive the plant therebetween while the harvesting apparatus moves longitudinally relative to the plant, a second longitudinal deflector plate between each of the second longitudinal conveyors to deflect produce onto the second longitudinal conveyors, a second conveyor motor drivingly connected to the second longitudinal conveyors and being electrically connected to the electric generator, a second lateral conveyor connected to the other side of the frame for receiving produce from the second longitudinal conveyors, a second lateral conveyor electric motor drivingly connected to the second lateral conveyor and being electrically connected to the electric generator, a second produce elevator connected to the other side of the frame for receiving produce from the second lateral conveyor, a second produce receptacle connected to the other side of the frame for receiving produce from the second produce elevator a deflector cover connected to the two pluralities of longitudinal conveyors to provide a substantially continuous surface between the two pluralities of conveyors, said cover being displaceable to allow the harvesting apparatus to move relative to the plant and the cover to be displaced by the plant as the harvesting apparatus moves longitudinally relative to the plant, a guide connected to the front end of the harvesting apparatus to guide the harvesting apparatus on the plant to be harvested, a plurality of continuous bands on the guide adapted for engagement with the plant to remain stationary relative to the plant while the apparatus moves relative to the plant, a support arm pivotally connected to each side of the frame, and a shaker mounted on each support arm for holding a portion of the plant to be harvested for shaking the portion of the plant while the harvesting apparatus moves longitudinal relative to the plant.

References Cited

UNITED STATES PATENTS

| | | | |
|---|---|---|---|
| 2,435,334 | 2/1948 | Wurtele | 56—119 XR |
| 2,436,648 | 2/1948 | Isom | 56—329 |
| 2,637,436 | 5/1953 | Andrews | 56—119 XR |
| 3,121,304 | 2/1964 | Herbst | 56—328 |
| 3,126,692 | 3/1964 | Weygandt et al. | 56—330 |
| 3,184,908 | 5/1965 | Rust | 56—330 |
| 3,187,493 | 6/1965 | Harrett | 56—330 |
| 3,205,644 | 9/1965 | Gordinier | 56—328 |
| 3,218,790 | 11/1965 | Edgemond | 56—329 |
| 3,255,578 | 6/1966 | Pertics | 56—330 |
| 3,325,984 | 6/1967 | Christie et al. | 56—330 |

RUSSELL R. KINSEY, Primary Examiner